Feb. 10, 1931.  D. L. ROULEAU  1,792,037
TOOL HOLDER
Filed April 1, 1929
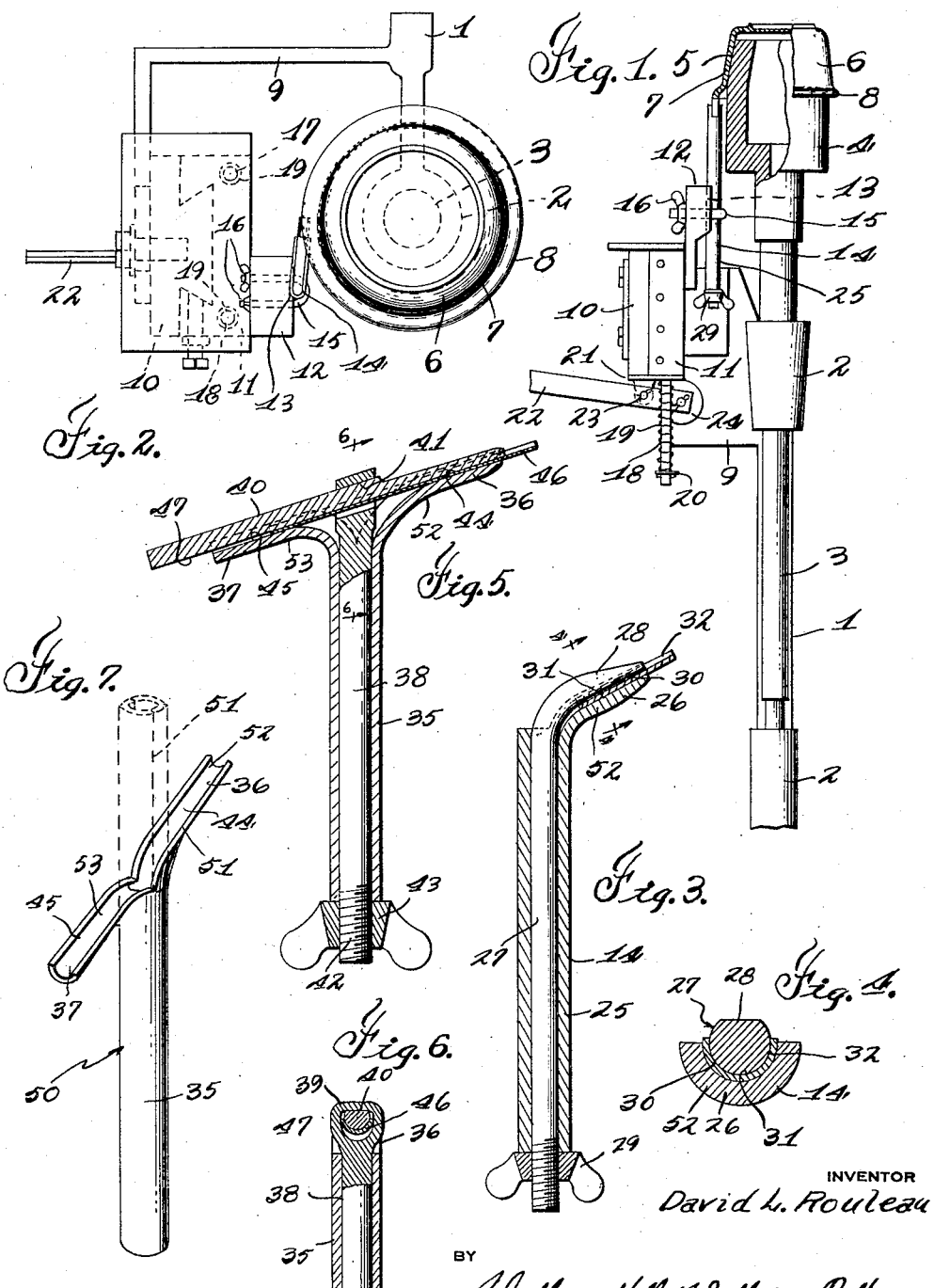
INVENTOR
David L. Rouleau
BY
Whittemore Hulbert Whittemore Belknap
ATTORNEYS Patented Feb. 10, 1931

1,792,037

UNITED STATES PATENT OFFICE

DAVID L. ROULEAU, OF MOUNT CLEMENS, MICHIGAN

TOOL HOLDER

Application filed April 1, 1929. Serial No. 351,766.

This invention relates to tool holders and has particular reference to a tool holder for use in a pottery topping machine.

An object of this invention is to provide a tool holder adapted to support a tool at an angle to the plane of rotation of the edge of the piece of pottery being topped.

This application is a continuation in part of my co-pending application, Serial Number 195,479, filed May 31, 1927.

Other objects and advantages of the invention will become more apparent as the following description proceeds, particularly when reference is had to the accompanying drawings wherein Figure 1 is an elevational view of a pottery topping machine showing a tool holder constructed in accordance with the teachings of this invention mounted on the same, Figure 2 is an end view with certain parts broken away of the machine shown in Figure 1, Figure 3 is a detail view of the tool holder, Figure 4 is a sectional view taken on the line 4—4 of Figure 3, Figure 5 is a longitudinal sectional view through a slightly modified form of a tool holder, Figure 6 is a sectional view taken substantially on the line 6—6 of Figure 5, and Figure 7 is a fragmentary perspective view of the tool holder illustrative of the method of making the same.

In the manufacture of articles of pottery such as tea cups and the like, it is customary to mold the clay to the desired form and after subjecting the same to a preliminary drying, to mount the same upon a rotatable chuck for the purpose of finishing or topping the outer edges of the article and sponging and polishing the sides preparatory to firing in the kiln. According to the present invention, the topping is carried out by a machine in which a tool is rigidly mounted in such relation to the rotating chuck that a slight feeding movement brings the tool into engagement with the edge of the work piece. The tool is concavo-convex in cross section and has its longitudinal axis arranged at an inclination to the plane of rotation of the edge of the cup and the angle is such that while providing clearance for the supporting portion of the tool the inner concave surface conforms to the shape of the rounded edge on the work piece.

Referring now more particularly to the construction illustrated in the drawings, the frame 1 is provided with bearings 2 for a shaft or spindle 3 on which is secured the chuck 4. The chuck is made of suitable form to receive the particular type of pottery which is to be finished, but in general it is provided with a conical surface 5. 6 represents the article of pottery, which in the present instance is a teacup, having the flaring sides 7 and the outwardly curved edge 8. The cup is held in an engagement with the chuck by friction.

Extending from the frame 1 is a bracket 9 on which is supported a dovetailed guideway 10. 11 is a slide mounted on the dovetailed guideway to reciprocate in a direction substantially parallel to the axis of the shaft 3. At one end of the slide is a bracket 12 having a recess 13 therein for receiving the tool holder 14. The tool holder is clamped in position by the U-shaped bracket 15 and thumb nuts 16. 17 and 18 are rods extending from the slide 11 and having sleeved thereon the springs 19. These springs abut at one end against the collars 20, and at the opposite ends against the strips 21, which latter are carried by the fixed guideway 10. For reciprocating the slide 11 there is provided a lever 22 fulcrumed at 23 on the fixed guideway and carrying a roller 24 engageable with the slide 11. Thus by moving the lever 22 the slide 11 is moved substantially parallel to the axis of the shaft 3 against the tension of the springs 17 and 18.

The tool holder 14 comprises a tubular portion 25 held by the clamp 15 and having the angularly extending jaw 26. Slidable within the tube 25 is a rod 27, which at one end has the angularly extending portion forming the cooperating jaw 28 and at the other end is threaded to receive a clamping nut 29. The jaw 28 has a convex surface 30, while the jaw 26 has the concave surface 31, these two surfaces cooperating to receive and clamp therein the tool 32. The tool 32 is concavo-convex in cross section and extends outwardly from the jaws 26 and 28 at such an angle as to engage the outer edge 8 of the cup at an inclination to the plane of rotation thereof. In this manner the cross sectional contour of the tool determines the curvature of the edge of the cup. The tool is inclined sufficiently with respect to the plane of rotation so that clearance is provided, thus insuring that only the outer edge of the tool contacts with the edge of the cup.

In Figures 5 and 6 a slightly modified form of tool holder is disclosed. This tool holder comprises a tubular portion 35 adapted to be held by the clamp 15 and having the oppositely angularly extending jaws 36 and 37. Slidable within the tube 35 is a rod 38, provided at one end with the ring 39. 40 is a rod forming a jaw which co-operates with the jaw portions 36 and 37. This rod is provided with the flattened upper face engageable with the inner periphery of the ring as at 41. The other end of the rod 38 is threaded as at 42 to receive a clamping nut 43.

The jaws 36 and 37 have the concave surfaces 44 and 45 respectively adapted to receive the tool 46, while the rod 40 has the convex surface 47 adapted to engage the concave surface of the tool 46 to clamp the same on the jaws 36 and 37.

In use, the tool is sharpened by cutting the worn end thereof to square or flatten the same and for this reason the modified form of tool holder finds particular utility, since it permits the use of a much longer tool. Thus the tool may be sharpened a number of times and by virtue of its length still be rigidly clamped in cutting position in the machine.

In Figure 7, there is illustrated one method by which the tool holders may be conveniently manufactured. By reference to this figure, it will be noted that the tool holder is formed from an elongated tube designated by the reference character 50. This tube is longitudinally slit at its one end as at 51, to form the segments 52 and 53 respectively. These segments are then bent laterally to extend angularly from the body portion of the tube to support the tool at the desired angle.

In forming the holder shown in Figures 3 and 4, one of the segments such as 53 may be cut off at its point of juncture with the body of the tube, thus having the single segment 52 forming the jaw 26. In forming the tool holder shown in Figures 5 and 6, however, both segments 52 and 53 are retained, these segments being oppositely bent to form the oppositely extending jaws 36 and 37.

In using the tool, the cups or other articles of pottery are successively engaged with the chuck 4, while the same is rotated and are held in position by friction engagement. The tool is then advanced into engagement with the edge of the cup by a manual or automatic operation of the lever 22, which imparts a substantially axial feed motion thereto. The angle of the jaws of the tool holder with reference to the body of the holder, is such that the tool is arranged at a proper inclination to the plane of rotation of the edge of the work piece to effect a smooth cutting of the same.

While the invention has been described with considerable detail, it is to be clearly understood that the description is for the purpose of illustration only, and that the right is reserved to make such changes in the details of construction and arrangement of parts as will fall within the purview of the attached claims.

What I claim as my invention is:

1. A tool holder comprising a pair of members having cooperating jaw portions adapted to clamp a tool, one of said members having a portion extended through the other of said members, and means carried by one of said members for locking said jaws in clamping position.

2. A tool holder comprising a member having a tool receiving jaw adjacent one end, a second member having a jaw portion cooperating with said tool receiving jaw to clamp a tool therein, said second member having a portion extending through said first mentioned member and projecting beyond the end thereof, and means engageable with the projecting end of said second mentioned member for drawing said jaw portions into clamping engagement with the tool.

3. A tool holder comprising a tubular member having a portion adjacent one end forming a tool receiving jaw, and means for clamping a tool in engagement with said jaw, said means including a rod extending through said tubular member, said rod having a portion forming a jaw cooperating with said tool receiving jaw.

4. A tool holder comprising a tubular member having an angularly extending portion for receiving a tool, and a rod extending through said tubular member having a portion cooperating with said angularly extending portion for clamping a tool therein.

5. A tool holder including in combination, a tubular member having an angularly extending jaw, a rod slidably mounted in said tubular member and having a portion forming a cooperating jaw, and means for clamping said rod in position whereby a tool may be clamped between said jaws.

6. A tool holder including in combination, a tubular member having an angularly extending jaw, a rod slidably mounted in said tubular member and having a portion forming a cooperating jaw, and means for clamping said rod in position whereby a tool may be clamped between said jaws, said means comprising a nut threadedly engageable with one end of said rod and bearing against the end of said tubular member.

7. A tool holder comprising a tubular member having an angularly disposed end forming a tool receiving jaw, a rod slidably mounted in said tubular member and projecting beyond the ends thereof, one end of said rod being formed with a jaw portion adapted to cooperate with said tool receiving jaw to clamp a tool therein and the other end of said rod being threaded, and a member threadedly engageable with the threaded end of said rod and abuttingly engageable with the end of said tubular member for clamping said jaws in tool clamping position.

8. A tool holder comprising a tubular member having an angularly extending jaw adapted to receive a tool, and a rod extending through said tubular member having an angularly arranged end cooperating with the said tool receiving jaw to clamp a tool therein.

9. A tool holder comprising a tubular member having an angularly arranged end forming a tool receiving jaw, a rod extending through said tubular member, and a ring carried by one end of said rod, said ring having a portion forming a jaw cooperating with said tool receiving jaw to clamp a tool therein.

10. In a tool holder, a tubular member longitudinally cut for a portion of its length to form a segment of arcuate cross sectional shape, said segment constituting a tool receiving jaw and means for clamping a tool in engagement with said jaw.

11. In a tool holder, a tubular member longitudinally cut adjacent one end to form a segment of arcuate cross sectional shape, said segment being bent at an angle to the axis of said tubular member and constituting a tool receiving jaw.

12. In a tool holder, a tubular member longitudinally cut adjacent one end to form a pair of segments of arcuate cross sectional shape, said segments being oppositely bent to extend at an angle to the axis of said tubular member and constituting a tool receiving jaw.

13. In a tool holder, a tubular member, and a tool receiving jaw formed on said tubular member by splitting the tubular member for a portion of its length adjacent one end to form a pair of segments and by oppositely bending said segments.

14. A machine for topping pottery comprising a rotatable chuck adapted to hold an article of pottery having an annular edge of rounded cross section, a tool holder mounted to move axially of said chuck, said tool holder having complementary jaws, one convex and the other concave in cross section and a segment of a cylindrical tube clamped between said jaws and extending at an inclination to the plane of rotation of said edge.

In testimony whereof I affix my signature.

DAVID L. ROULEAU.